United States Patent [19]

Ziegelmeyer

[11] 4,111,088
[45] Sep. 5, 1978

[54] CUT-OFF GAUGE FOR SAW TABLES

[76] Inventor: Lynn J. Ziegelmeyer, 113 Cottage, #2A, P.O. Box 1112, Medford, Oreg. 97501

[21] Appl. No.: 477,604

[22] Filed: Jun. 10, 1974

[51] Int. Cl.² .......................................... B27B 27/06
[52] U.S. Cl. .................................... 83/471.2; 83/468; 83/522; 33/76 R
[58] Field of Search .............. 33/76 R; 83/468, 522, 83/471.2; 403/13, 14, 376, 377

[56] References Cited

U.S. PATENT DOCUMENTS

| 305,563 | 9/1884 | Baer | 83/468 |
|---|---|---|---|
| 1,123,711 | 1/1915 | Driscoll | 269/303 |
| 1,461,425 | 7/1923 | Linebaugh | 83/468 |
| 1,924,326 | 8/1933 | MacFadden | 403/13 X |
| 2,518,728 | 8/1950 | Snow | 269/303 |
| 2,606,413 | 8/1952 | Gray | 403/376 X |
| 2,619,134 | 11/1952 | West | 83/468 |
| 2,747,625 | 5/1956 | Small | 83/468 |
| 2,852,049 | 9/1958 | Peterson | 83/467 |
| 2,962,063 | 11/1960 | Gussler | 83/468 |
| 3,059,674 | 10/1962 | Boling | 83/468 |
| 3,089,716 | 5/1963 | Berkowitz | 403/13 |
| 3,391,717 | 7/1968 | Melin | 83/468 |
| 3,807,269 | 4/1974 | Mertes | 83/468 |

*Primary Examiner*—Charles E. Phillips
*Attorney, Agent, or Firm*—Clarence M. Crews

[57] ABSTRACT

This invention provides a convenient and dependable metallic fence, end gauge, and precise length indicating combination for use with power saws which travel through the work. The invention further provides fence sections of several selected lengths which may be combined end to end to provide, for practical purposes, a fence of any desired length.

2 Claims, 8 Drawing Figures

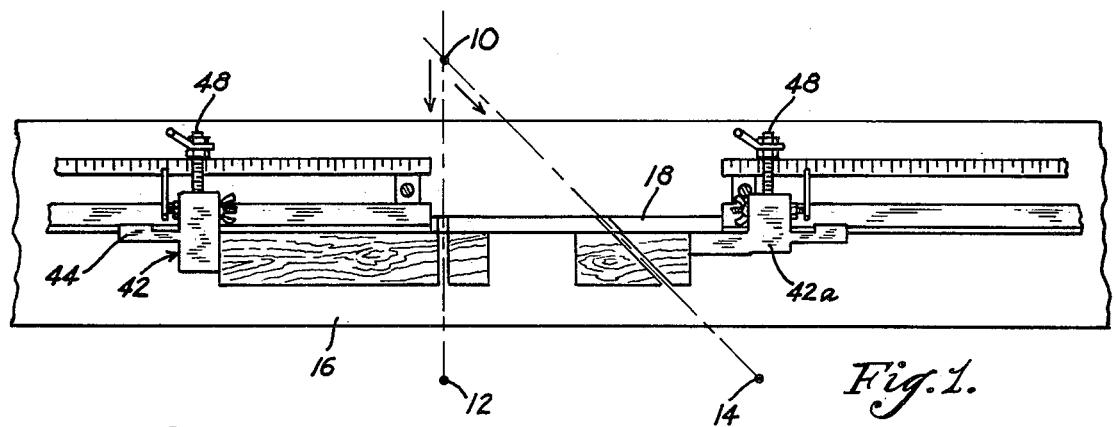
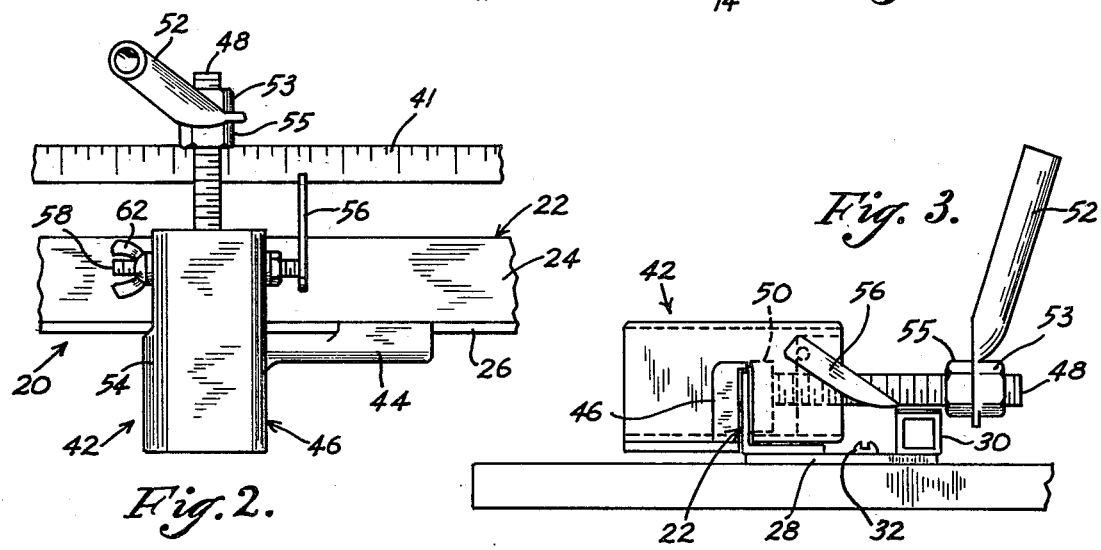
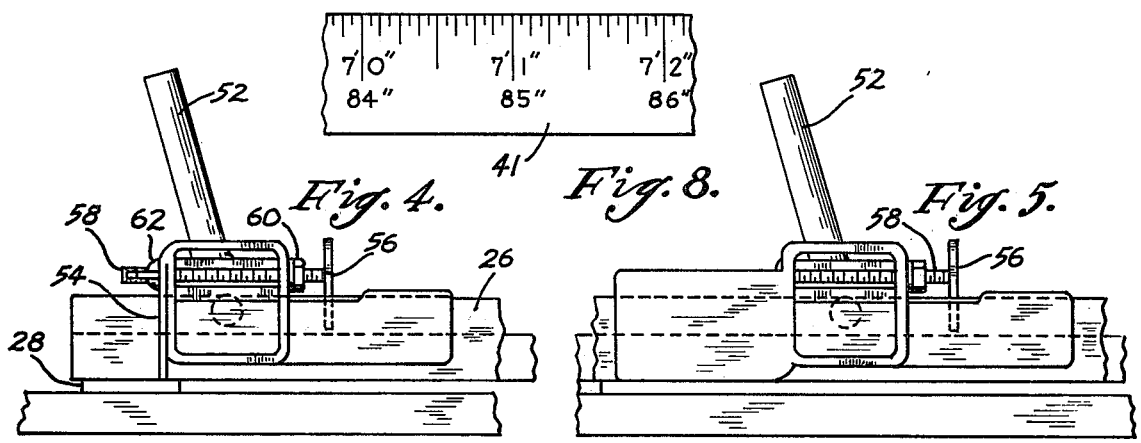
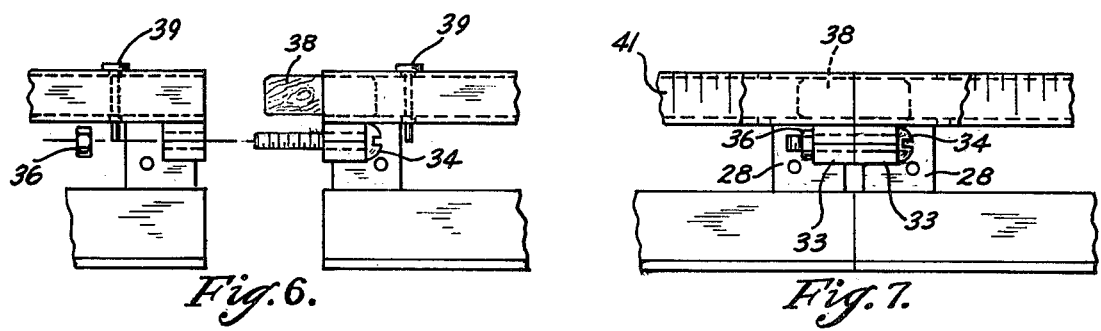

CUT-OFF GAUGE FOR SAW TABLES

This invention has to do with precision sawing, and particularly with work positioning means adapted for use in connection with a power saw that travels through the work piece at a variety of prescribed angles. Conventionally, a saw table is equipped with an upstanding wooden straight edge or fence member through which the saw blade can travel without detriment to the teeth of the blade. For the hobbyist or amateur making just one specimen of a given object, a table of slight length equipped with a wooden straight edge member that extends the full length of a comparatively short table may suffice, but for professional use where many objects having identical specifications are to be manufactured, additional requirements must be met if assured uniformity, precision and economy of time are to be realized.

For meeting the requirements of different manufacturers and of different articles to be manufactured, tables may have to be provided which extend far to the right of the line of cut and/or far to the left of the line of cut. In every instance a length of conventional wooden fence is employed through which the saw may freely cut at a desired angle, and thereafter freely travel without detriment to the saw teeth.

In accordance with the present invention, metallic fence extension members are provided for alignment with the work engaging face of the wooden fence member, such metallic fence members being desirably made in lengths of eight feet, six feet, four feet and two feet, all adapted to be selectively secured end to end in fixed relation to the table, and in exact alignment with the wooden fence member and with one another. By proper selection of the metallic fence pieces to be employed, and by judicious adjustment of the length of the wooden fence piece, a composite fence of any desired length may be provided.

The simple or composite metallic fence member is designed to carry both a lengthwise settable end stop or gauge, a fixed length indicator scale, and indicator means carried by the end stop and cooperative with the scale for determining and controlling the exact length the material will have after square cutting.

It is a feature that a scale in the form of adhesive tape graduated in suitable linear units, illustratively in feet and inches, is applied to the stationary, metallic fence member.

It is a further feature that a pointer member, cooperative with the scale and carried by the stop, is adjustably mounted on the stop. This has two pronounced advantages:

(1) If the scale has not been precisely applied to the fence, the error can be corrected by cutting a test piece of wood, measuring it and readjusting the pointer member on the stop to indicate precisely the measured length. All square cut lengths will then be precisely indicated because the pointer is necessarily readjusted in unison with the stop;

(2) If a saw blade of one thickness is replaced by a new blade of a different thickness, a test piece can again be cut and measured and the pointer can be reset relative to the stop.

In either case the reset pointer will correctly indicate the setting of the stop for all desired square cut lengths.

For correctly aligning adjacent fence sectionns and assuring precise abutment of them, each fence section is made to include an upstanding tube parallel to the work aligning surface of the fence, the tube being of precisely predetermined internal cross-section to fit and receive a block which is made of the same cross-section, and of substantial length. Transversely aligned holes are provided in opposed vertical walls of the upstanding portion of the tube, the holes being so located that nails inserted in the holes will extend across the recesses, to block the hollow passages and thereby limit penetration of the block into each tube to a depth not substantially greater than half the length of the block. When the sections are brought into abutting relation, the limitation of penetration of the block into one tube compels the insertion of the block into the other tube to a depth nearly as great as half the length of the block. When the fence sections have been thus brought together and aligned, the added fence section may be secured to the table in the position so determined, and the nails or pins may be withdrawn.

Other objects and advantages will hereinafter appear.

In the drawing forming part of this specification,

FIG. 1 is a plan view of a saw table with potential lines of cut indicated and with right hand and left hand fence, and length indicator stop commbinations applied; the right hand stop being arbitrarily shown as designed with a work length reducing extension and the left hand stop being arbitrarily shown without any such extension;

FIG. 2 is a fragmentary, detail plan view on a larger scale than FIG. 1, showing particularly a right hand, adjustable stop, together with length indicating means which includes a fixed scale and a pointer, the pointer being adjustable both with, and relative to, such stop;

FIG. 3 is a fragmentary view in end elevation of the structure shown in FIG. 2, as seen from the right in FIG. 2;

FIG. 4 is a fragmentary view in front elevation of the structure of FIGS. 2 and 3;

FIG. 5 is a fragmentary view in front elevation showing particularly the right hand, diagonal cut stop of FIG. 1;

FIG. 6 is a fragmentary plan view showing two of the metallic fence sections about to be joined end to end;

FIG. 7 is a fragmentary plan view similar to FIG. 6, but showing the fence sections united; and FIG. 8 is a fragmentary plan view of a portion of the length indicating tape 41.

In the drawing the saw itself is not shown, but the saw is a conventional, rotary, power saw, carried by a frame (not shown) which frame is mounted for pivotal movement about a vertical axis indicated by the point 10. The saw is mounted for linear movement on and relative to the frame along any chosen, radial line such as the square-cut radial line 10-12, or the oblique-cut radial line 10-14.

In some machines the line of cut is radial while in others it is tangential to a circle having the saw arm pivot for a center. In still other machines the line of cut is radial and the pivot about which the saw is adjusted is located in the line of contact of the work with the fence.

In the illustrative machine, a saw table 16 is provided for supporting the work pieces to be sawed, the table being equipped, as is conventional, with an upstanding straight wooden fence member 18 against which the work is normally placed and held during cutting. The saw notches the wooden fence member at a different point for each different angle of cut. The table may be made of any desired length, according to the requirements of the particular user, and the same thing is true of the wooden fence, but when the present equipment is provided the work engaging face of the fence is extended to any length desired by a metallic fence, so the wooden portion of the fence will normally be comparatively short and generally not more than two feet in length.

In most installations there is no need for both right hand and left hand metallic extensions of the wooden fence 18 as illustrated in FIG. 1, but where both are required they can be made available in conjunction with a single saw and a single wooden fence. Provision can be made for square or oblique cuts in conjunction with either a right hand fence extension or a left hand fence extension, or with both. Oblique cuts in the third or fourth quadrants can be made with a left hand fence extension or with a right hand fence extension, but unless the saw frame pivot lies in the work engaging vertical plane of the fence a chart will have to be kept for each machine, showing the length correction required for each angle of oblique cut.

The right hand and left hand metallic fence extension members are of identical construction. Such sections are, however, made in varying, arbitrarily chosen lengths (say, two feet, four feet, six feet and eight feet, for example), and they are adapted to be joined end to end in perfect alignment in any desired combination of lengths.

Each section 20 comprises an angle bar 22 which includes a horizontal web 24, desirably of uniform width, and a vertical web 26 of definite, uniform height. The angle bar 22 is permanently connected at its ends and at intervals through tie strips 28 with a hollow metallic tube 30, desirably of square cross-section, which tube is precisely parallel to, and is desirably coterminous with, the angle bars 22. The tie strips 28 are desirably permanently secured, as by welding, to the underfaces of the angle bars 22 and of the tubes 30. The tie strips 28 are firmly and precisely attached to the saw table by screws 32.

The square tubes 30 have exteriorly affixed to their end portions tubular ears 33, through which adjacent sections 20 may be secured in abutting relation to one another by screws 34 and nuts 36. Because the ends of the square tubes, the angle bars 22 and the ears 33 are flush with one another, in a plane at right angles to the lengthwise dimension of the fence extension members, the joined fence extension members will be disposed in exact alignment with one another. An added extension member is not screwed down to the saw table, however, until it has been firmly and accurately secured to the adjoining member already in place.

For convenience in securing initial alignment of the ears 33, a block 38, square in cross-section, is provided which fits snugly into the ends of adjacent, aligned square tubes 30. Each square tube 30 has transversely aligned holes in its opposed vertical faces through which the shanks of nails or rods 39 are temporarily inserted. The holes are located predetermined equal distances in from the ends of the tubes, say between one and two inches. The square block is made to have a length a little less than twice this chosen distance. The purpose of the nails is to compel the block to protrude for nearly half its length at least from each of the tubes 30, so that each tube will necessarily contain nearly half the length of the block, at least, when the tubes are drawn together. When the tubes have been so aligned and abutted with the aid of the block, the nails are withdrawn and the screw 34 and nut 36 are applied.

The tube 30 has a substantial width, say of ¾ inch, stands up for about the same distance or more above the saw table top and extends in exact parallelism with the upstanding fence web 26 of the angle bar 22. If more than one fence length is used the successive vertical webs are aligned and the successive tubes 30 are aligned in parallelism with the webs. Such relationships are maintained by the screws 32.

A strip 41 of adhesive tape having substantially the width of the tube or tubes 30 and graduated to provide a scale in suitable linear units, say both in feet and inches and in total inches, is fixedly applied to the upper surface of the tube or tubes 30. The scale strip is designed to indicate the exact distance that the work engaging face of a work stop 42 is mounted on the web 26 from the equivalent line 10-12, or rather, since that so-called line has the width of the saw cut, from the nearer edge of the notch made by the saw in the wooden fence member. For this purpose the work stop 42 has secured upon it a pointer 56 cooperative with the scale.

When preparing the machine for square cutting, a work stop 42 like the left-handed work stop of FIG. 1 or the right-handed work stop of FIG. 4 is employed. The work stop rests upon the web 26, being shouldered for that purpose and being formed with a slotted extension arm 44 at the side remote from the work engaging face of the stop, which arm is formed to ride upon the upper edge of the web 26 and to extend down against the side of such web which is nearer the operator.

The work stop 42 is thus made to include an abutment member 46 which bears against the face of the web 26 nearer the operator. A screw 48 which is threaded through the forward end of the work stop (the end remote from the operator) carries at its rear end a clamping plate 50 which, in cooperation with the abutment member 46, clamps the stop firmly in any chosen position along the web 26. The screw 48 is provided with an operating handle 52. As shown, the handle 52 is secured firmly in fixed but adjustable relation to the screw between nuts 53 and 55 threaded on the screw. The adjustment of the handle relative to the screw is so chosen that a convenient fractional turn will suffice for shifting the work stop clamp between a free position and a firm clamping position.

When the scale strip 41 is to be applied to the upper face of the tube 30, the saw blade may be set in position to intersect the wooden fence member 18, a strip of wood of precisely known length may be used to space the work end engaging face 54 of the work stop 42 from the saw line at precisely that distance. The work stop is there fixed in place by turning of the handle 52.

Before the tape is put in place, however, a pointer 56, which is mounted on the work stop and is adjustable lengthwise of the fence and relative to the work stop, must be set to an intermediate position within its range of adjustment so that it can later be readjusted in either direction relative to the tape, if it should develop that the tape has been imprecisely applied. As best seen in FIGS. 2, 4 and 5, the pointer 56 is made fast on the end of a screw 58 which extends through the work stop 42 in parallelism with the metallic fence. The screw has a nut 60 threaded on it at one side of the work stop and a wing nut 62 threaded on it at the opposite side of the work stop.

With substantial portions of the screw protruding beyond the nuts 60 and 62, the tape 41 is applied to the upper face of the tube 30 so as to make the pointer indicate on the scale the length of the measured strip. Surplus end portions of the tape are then cut off. The length of the measured strip should desirably be chosen so that a correct positioning of the tape will cause the pointer to coincide with a graduation mark.

There is always a possibility that the graduated tape will be imprecisely applied, at least to a slight extent. Should this be found to be the case, the error can be corrected, not by peeling off and reapplying the tape, but by finely readjusting the pointer 56 to the correct reading. This is done simply by backing off one of the nuts 60 or 62, to the required extent, shifting the work stop into contact with the backed-off nut, and tightening the other nut.

The provision for adjustment of the pointer relative to the work stop is an important feature from another point of view. Different saws have different thicknesses, so that a change of saws could introduce error. When a change of saws has been made, therefore, a test place is cut, accurately measured, and used, if necessary, for guidance in readjusting the position of the pointer 56 relative to the work stop. The readjusted pointer will indicate precisely all square-cut lengths. The right hand and left hand work stops used for square cuts are desirably mirror images of one another, the work stop 42 of FIG. 1 being a typical left hand work stop.

For oblique cuts, the same right hand and left hand work stops are used, but for a given angle all pointer indicated measurements will be out by a uniform amount. For each machine a notation of the amount of correction required should be made. A typical right hand work stop 42a is seen as a right hand work stop in FIG. 1. As will be readily apparent, the work stops 42 and 42a differ from one another not only in the fact that one is right-handed and one is left-handed, but also in the fact that the stop 42a includes a work engaging face at the left end of an arm that extends for a substantial distance to the left of the screw 48. This serves materially to reduce the minimum length of cut available for square cutting.

Either a right hand work stop or a left hand work stop can be made with or without such an extension. In any case, the measuring strip is applied and the pointer is adjusted to afford true measurements of square cut work pieces consistent with the stop used.

I have described what I believe to be the best embodiment of my invention. What I desire to secure by Letters Patent, however, is set forth in the appended claims.

I claim:

1. A directly readable length indicating, sawing structure comprising the combination with a work supporting saw table and a saw adapted for travel over the table, of
    (a) a metallic fence member fixedly secured to said table in non-conflicting relation to said saw and having a fixed upstanding work aligning face,
    (b) a work length indicating scale affixed to the table and extending in the same direction as the work aligning face of the fence member,
    (c) a work-piece stop adjustable along said fence member and including a work-piece-end-engaging face disposed at right angles to the work aligning face of the fence member,
    (d) means for fixing the stop in any desired position along the fence member,
    (e) a pointer mounted directly on the work-piece stop and cooperative with the scale,
    (f) means for finely adjusting the pointer relative to the work-piece-end-engaging face of the work-piece stop on which the pointer is mounted, the construction and arrangement being such that the fine precision of cutting length indicated on the fixed scale by the pointer can be established and maintained for varying lengths throughout an available range of adjustment of the work-piece stop, and the pointer carried thereby, and
    (g) the fence consisting of a plurality of like sections mounted end to end, the sections having alignable hollow portions of identical cross-section in which a block of appropriate shape may be fitted, and correspondingly located perforated ears at their extremities through which the sections may be clamped to one another.

2. A sawing structure as set forth in claim 1 in which the hollow portions of the fence and indicator members have cross-perforations in which block obstructing members may be inserted, each cross-perforation being located inward from the end of the fence section by a little more than half the length of the block but substantially less than the entire length of the block, the construction and arrangement being such that the block is necessarily maintained during alignment for substantial parts of its length in both of the adjoining fence sections.

* * * * *